United States Patent
Balles et al.

(10) Patent No.: US 7,308,886 B2
(45) Date of Patent: Dec. 18, 2007

(54) METHOD FOR OPERATING AN INTERNAL COMBUSTION ENGINE DURING ENGINE BRAKING

(75) Inventors: Fabian Balles, Munich (DE); Gregor Rottenkolber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/518,283

(22) Filed: Sep. 11, 2006

(65) Prior Publication Data

US 2007/0062487 A1    Mar. 22, 2007

Related U.S. Application Data

(63) Continuation of application No. PCT/EP2005/002256, filed on Mar. 3, 2005.

(30) Foreign Application Priority Data

Mar. 10, 2004   (DE) ...................... 10 2004 011 652

(51) Int. Cl.
*F02D 13/04* (2006.01)
(52) U.S. Cl. .................. 123/321; 123/322; 60/602
(58) Field of Classification Search ............... 123/321, 123/322, 323; 60/611, 612, 602
See application file for complete search history.

(56) References Cited

U.S. PATENT DOCUMENTS

| | | | |
|---|---|---|---|
| 5,437,156 A * | 8/1995 | Custer | ................ 60/611 |
| 5,889,476 A | 3/1999 | Schmitz | |
| 6,148,793 A * | 11/2000 | Faletti et al. | ................ 123/322 |
| 6,263,673 B1 * | 7/2001 | Schmidt et al. | ................ 60/602 |
| 6,718,937 B2 | 4/2004 | Kim | |
| 2003/0131805 A1 | 7/2003 | Yang | |

FOREIGN PATENT DOCUMENTS

| | | |
|---|---|---|
| DE | 42 36 009 A1 | 10/1992 |
| DE | 195 46 652 A1 | 12/1995 |
| DE | 101 43 330 A1 | 9/2001 |
| DE | 100 16 421 A1 * | 10/2001 |
| DE | 101 64 158 A1 | 12/2001 |
| WO | WO 03/027451 A1 | 4/2003 |

* cited by examiner

*Primary Examiner*—Hieu T. Vo
(74) *Attorney, Agent, or Firm*—Crowell & Moring LLP

(57) ABSTRACT

The invention relates to a method for operating an internal combustion engine of a motor vehicle in engine braking mode, in which the internal combustion engine is operated with at least one unfired cylinder, and the internal combustion engine has variably controllable valve drives for intake and exhaust valves of each cylinder, and a turbocharger device for increasing pressure in the intake tract of the cylinder. The object of the invention is to improve the engine braking characteristic and the response of the turbocharger device. The object is achieved by controlling the intake valves and exhaust valves for setting a specified braking torque that may be set by compressing the air mass in each unfired cylinder.

7 Claims, 4 Drawing Sheets

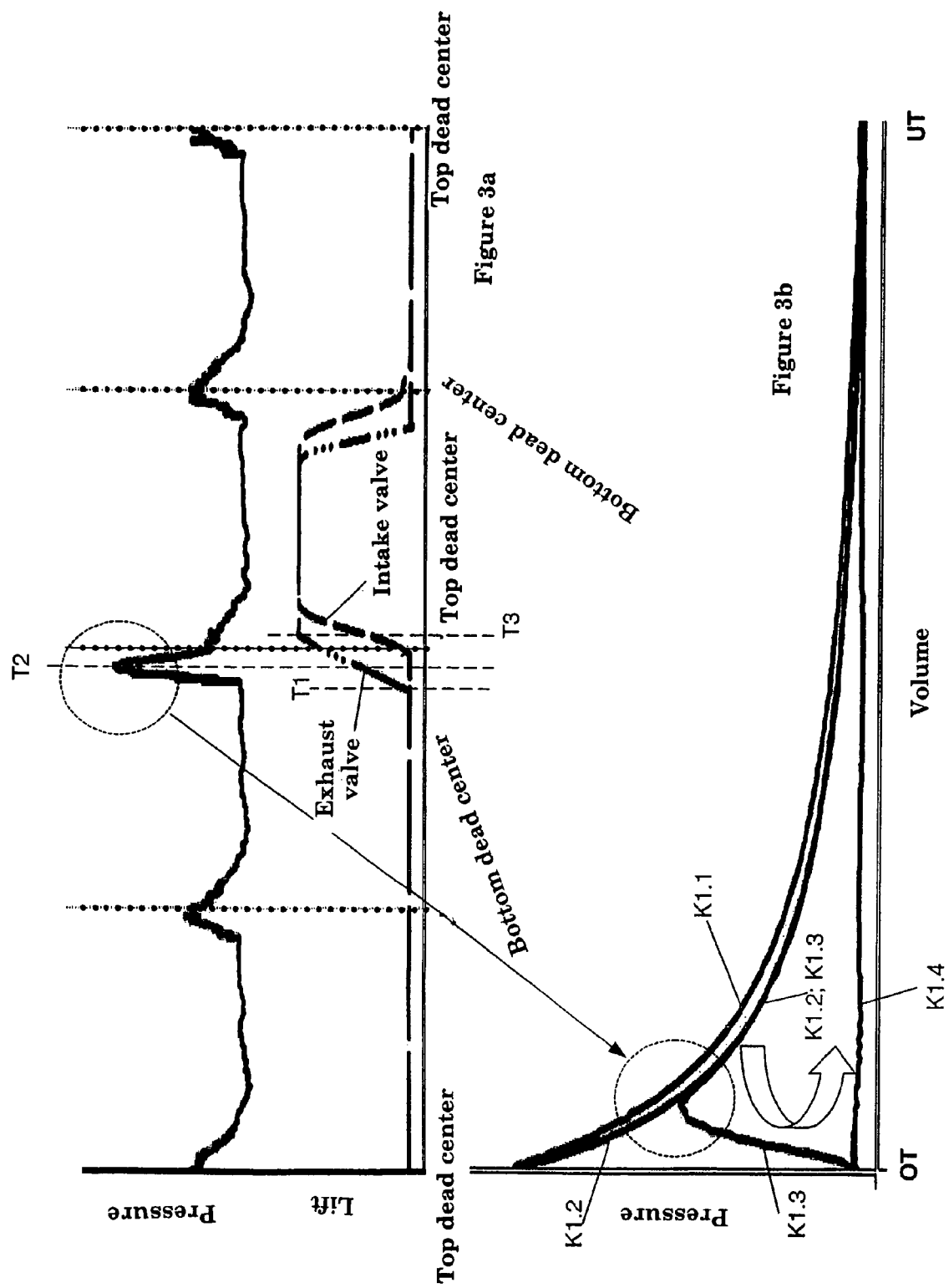

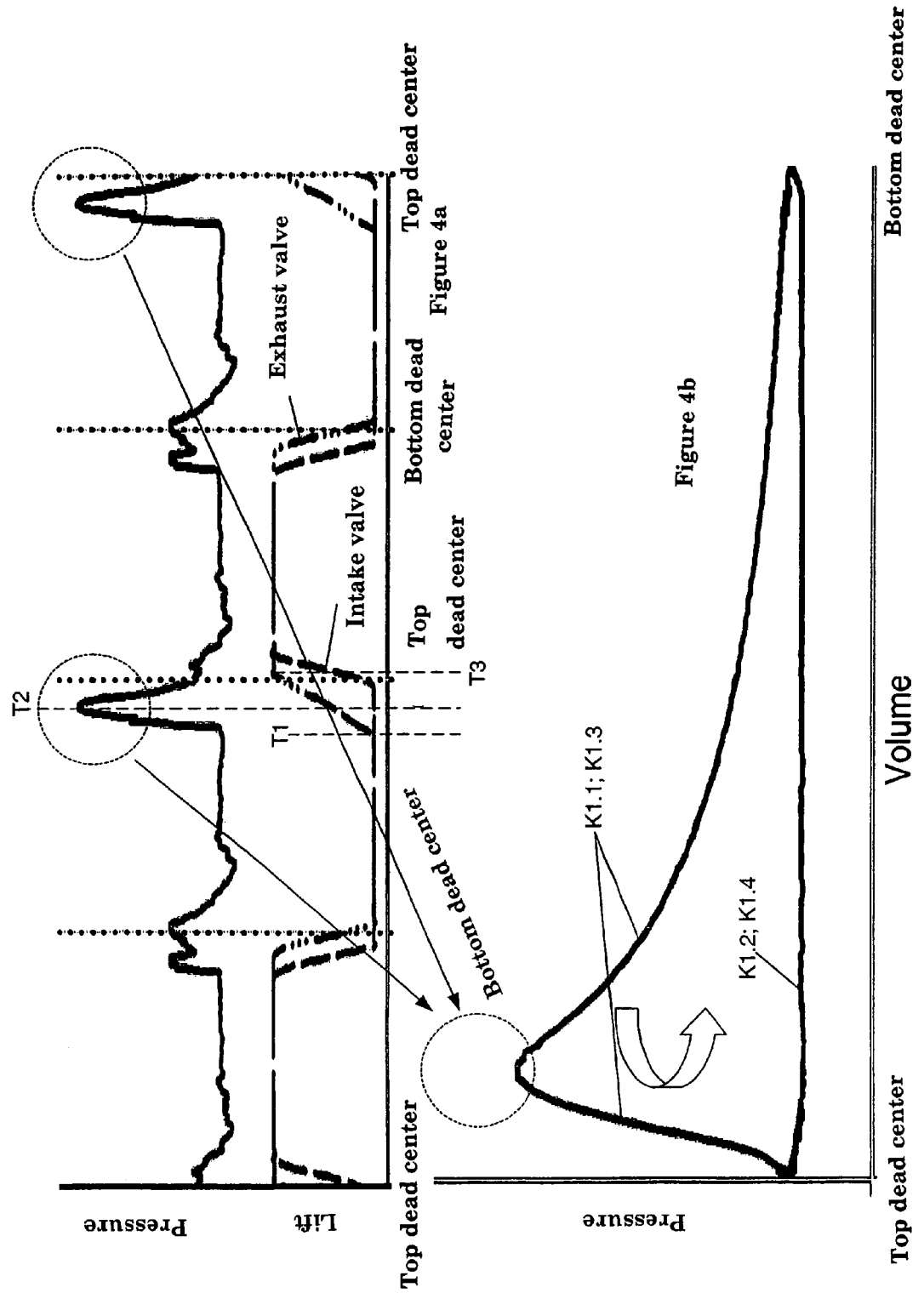

METHOD FOR OPERATING AN INTERNAL COMBUSTION ENGINE DURING ENGINE BRAKING

This application is a continuation of International Application No. PCT/EP2005/002256, filed Mar. 3, 2005, and claims the priority of DE 10 2004 011 652.0, filed Mar. 10, 2004, the disclosures of which are expressly incorporated by reference herein.

BACKGROUND AND SUMMARY OF THE INVENTION

The invention relates to a method for operating an internal combustion engine of a motor vehicle in engine braking mode.

In engine braking or overrun mode, in which no additional fuel is supplied to the internal combustion engine and further combustion is thus prevented, any internal combustion engine in a motor vehicle undergoes a certain braking effect due to the charge exchange work to be performed. Compared to conventionally controlled internal combustion engines, which have a predetermined, generally very low braking torque on account of their mechanically controlled valve drive having fixed control times and valve lifts, internal combustion engines having variable-control valve drives (freely adjustable control times), such as variable-control electromagnetic valve drives, for example, generate a variably controllable braking torque of greater magnitude. German Patent Publication DE 195 46 652 A1 describes a method for reducing the speed of a vehicle equipped with a collision avoidance system, in which the vehicle is braked as a function of distance by changing at least one cylinder to compressor drive in the internal combustion engine provided with a variable valve drive.

Furthermore, an internal combustion engine is known from German Patent Publication DE 101 43 330 A1, having electrohydraulic valve control for a motor vehicle which supplies additional hydraulic consumers, such as a supercharger device for compression of the required combustion air, for improving the overall efficiency of the internal combustion engine having excess hydraulic delivery flow to a hydraulic pump for controlling the valves.

The object of the invention is to provide a method for operating an internal combustion engine having a turbocharger device, which achieves a settable increased engine braking effect. In one preferred embodiment of the invention, a spontaneous response characteristic of the internal combustion engine, in particular in overrun mode, is ensured.

According to the invention, the object is achieved by the controlled compression (control of the exhaust valves) of an adjustable air mass (control of the intake valves) in the combustion chamber of at least one cylinder that is switched off (i.e., unfired, or not supplied with fuel in at least one cylinder combustion chamber), making it possible to generate an increased settable braking torque for braking the vehicle.

Furthermore, a spontaneous response characteristic of the internal combustion engine may be ensured at all times by generating a pressure pulse which is produced by the targeted control of the exhaust valves for the spontaneous release of the previously compressed air mass (as a function of the control of the intake valves) and by the targeted impingement of a turbocharger device by this pressure pulse. As a result of the pressure pulse generated in each work cycle, the turbine for the turbocharger device may be continuously maintained at a significantly increased rotational speed. The sluggish starting response of conventional internal combustion engines having a turbocharger device, the turbines of which must be accelerated starting from a very low rotational speed, is avoided by the subject matter of the invention.

In one preferred refinement of the invention, for generating a pulse of maximum pressure all intake valves for every cylinder included for producing the braking effect (preferably all cylinders) are controlled in such a way that the largest possible air mass is drawn into the cylinder combustion chamber (approximately corresponding to control of the intake valves in full-load operation), and the exhaust valves for all cylinders are controlled in such a way that the compressed air mass is not released until just before top dead center (TDC) of the piston.

The desired braking torque is advantageously set by the type of control of the valves, but alternatively or additionally may be achieved by switching between different engine operating modes (two-cycle operation, four-cycle operation, or the like) and/or by the variable number of cylinders used for the braking mode. Setting of the braking torque by control of the valves may be realized in a first embodiment by variably controlling the intake valves in full-load operation (intake of the greatest possible air mass), and variably controlling the exhaust valves for adjusting the compression rate of the air mass provided by the intake valves. In a second embodiment, the intake valves are variably controlled for setting the braking torque by opening the exhaust valves at the latest possible time before TDC. Lastly, in a third possible embodiment the intake valves as well as the exhaust valves are variably controlled for setting a desired braking torque.

For the setting of the desired braking torque by different operating modes, the unfired cylinders may, for example, be switched back and forth between two-cycle operation and four-cycle operation, and/or the number of unfired cylinders may be varied. Since in four-cycle operation one compression and one expansion occurs between two consecutive braking cycles, and the former do not contribute significantly to the braking effect, an optimum combination of the braking effect to be achieved and the high rotational speed of the turbocharger device is achieved in two-cycle operation.

Other objects, advantages and novel features of the present invention will become apparent from the following detailed description of the invention when considered in conjunction with the accompanying drawings.

BRIEF DESCRIPTION OF THE DRAWINGS

FIG. 3a shows a diagram representing the progression of the valve lifts of intake and exhaust valves for control according to an embodiment of the inventive method in four-cycle operation, and the resulting exhaust gas dynamics;

FIG. 3b shows a p-V state diagram corresponding to the operating mode in FIG. 3a;

FIG. 4a shows a diagram representing the progression of the valve lifts of intake and exhaust valves for control according to an embodiment of the inventive method in two-cycle operation, and the resulting exhaust gas dynamics; and FIG. 4b shows a p-V state diagram corresponding to the operating mode in FIG. 4a.

DETAILED DESCRIPTION

Figure 1:
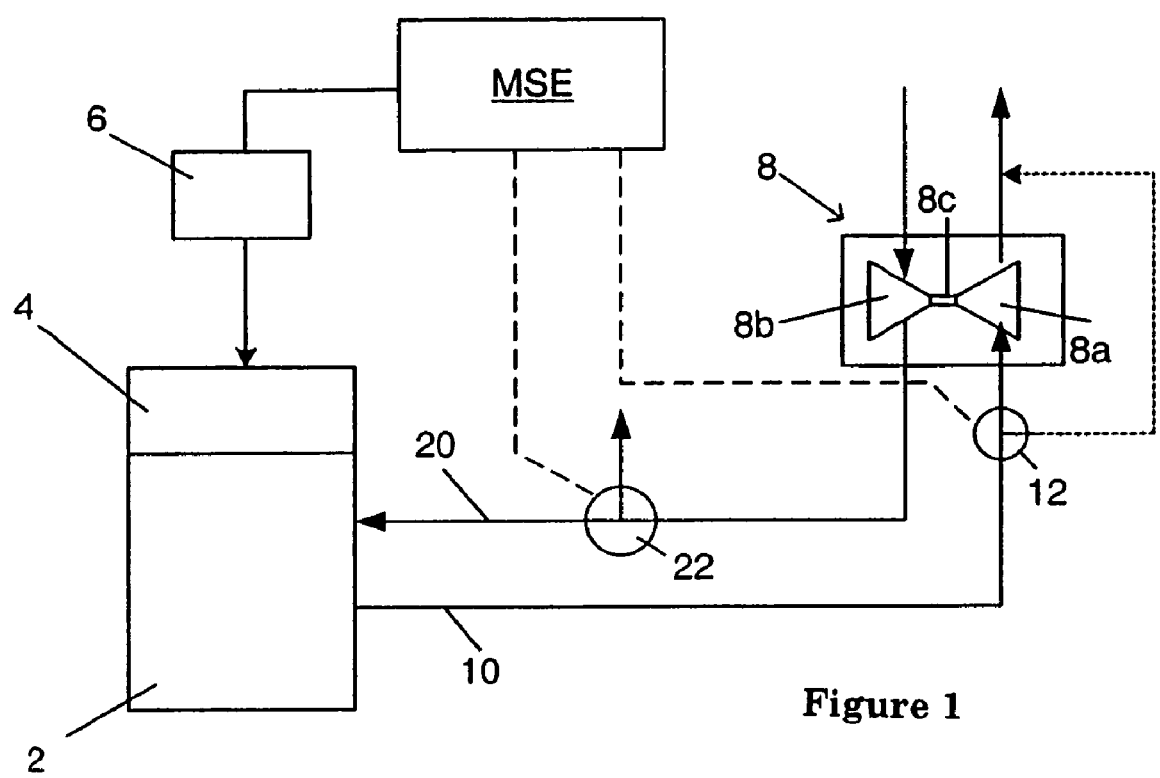
FIG. 1 shows the schematic illustration of an internal combustion engine having an electromagnetic valve drive and a turbocharger device.

FIG. 1 shows an internal combustion engine 2 having an electromagnetic valve drive 4 and a control device 6 for the targeted control of the electromagnetic valve drive 4. The internal combustion engine 2 is connected to a turbocharger device 8 via an exhaust line 10 on the exhaust side and via an intake line 20 on the intake side. The turbocharger device 8 can be driven via the turbine wheel 8a thereof by the exhaust flow produced by the internal combustion engine 2. The turbine wheel 8a of the turbocharger device 8 is connected via a shaft 8c to a compressor wheel 8b, so that fresh air is drawn in from the outside through the drive of the turbine wheel 8a and the drive of the compressor wheel 8b mechanically connected thereto, and is compressed in the intake tract of the internal combustion engine 2. It is thus possible to achieve significant increases in the power of the internal combustion engine, specifically, in the mid-range of the rotational speed. Since the exhaust flow generated in idle or overrun mode during operation of the internal combustion engine according to the prior art is not sufficient to accelerate the turbocharger device 8 to, or maintain the acceleration thereof at, a corresponding provided rotational speed, heretofore it has been necessary to overcome the inertia of the turbocharger device anew for each acceleration process, proceeding from an overrun mode. The user of the vehicle perceives this as so-called "torque or turbo-lag deficiency," as the result of which the initiation of increased power is considerably delayed.

By use of the method according to the invention, in which in braking or overrun mode the braking torque is set in a targeted manner by control of the intake and exhaust valves, in comparison to operation according to the prior art it is possible to provide a significantly larger braking torque. As a result of the targeted control of the intake valves (in particular when the method according to the invention is used in unthrottled engines, i.e., in engines without a throttle valve), in overrun or braking mode, for example, significantly more air (for example, air filling under full load) may be drawn into the combustion chamber for compression than in the normal case, and as a result of the targeted control of the exhaust valves, for example by opening the exhaust valves just before reaching top dead center for the piston, the air mass available for compression in the combustion chamber (and therefore available for generating the braking torque) may be compressed to the greatest possible extent, thereby achieving a maximum braking torque.

In one preferred refinement of the invention, the compressed air mass required for setting the braking torque is released in a targeted manner such that a pressure pulse is conducted through the exhaust duct to the turbocharger device 8, thereby preaccelerating the turbocharger device 8 to an increased rotational speed during the engine braking process. In this manner it is possible to realize a significantly improved response characteristic of the internal combustion engine in which the increase in power of the turbocharger device 8 has become effective at a considerably earlier time.

The method according to the invention may be used in both two-cycle and four-cycle operation, or in operating modes having other cycle rates. In one preferred application, the method according to the invention is used in conjunction with valve control of the unfired cylinders in two-cycle operation. In this case, in contrast to four-cycle operation each compression process may be transformed into an additional braking torque and a pressure pulse which may be relayed to the turbocharger device 8.

To limit overpressure in the intake tract of the internal combustion engine 2 while maintaining the rotational speed of the turbocharger device 8, it is preferable to provide a bypass valve 22 in the intake line 20. This bypass valve may be correspondingly controlled via the engine control device MSE, making it possible to regulate the pressure in the intake tract while maintaining the turbocharger rotational speed. In addition, a charge pressure limiting valve 12 may be present in the exhaust line 12 or in the turbocharger device 8 itself, and this pressure limiting valve likewise may be controlled via the engine control device MSE.

The method according to the invention is independent of special operating principles for variable valve control, it being essential only that the valve control times of intake and exhaust valves are variably controlled. The method is preferably used for electromagnetic valve drives having lifting or rotary actuators.

Based on a typical internal combustion engine in which turbocharger rotational speeds of defined magnitude are achieved in overrun mode regardless of the particular internal combustion engine, by use of the method according to the invention in four-cycle operation this rotational speed may be increased to turbocharger rotational speeds in the range of 60% to 70% of the rotational speed at full load. In two-cycle operation, significantly higher turbocharger rotational speeds are achievable in engine braking mode.

Figure 2:
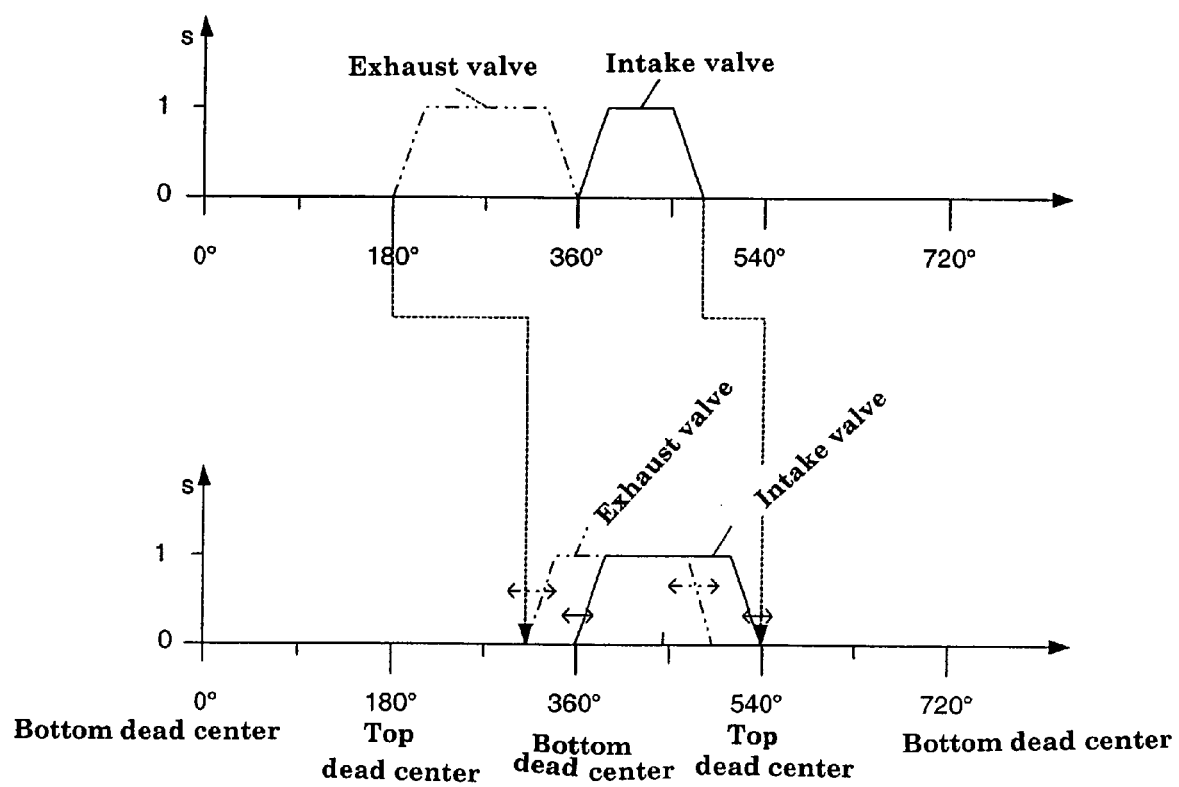
FIG. 2 shows a diagram with curves for the control of intake and exhaust valves of a cylinder in four-cycle operation.

FIG. 2 shows in a schematic illustration the control of intake and exhaust valves of a cylinder in four-cycle operation. The EV curves illustrated by solid lines represent the intake valves, and the AV curves illustrated by dotted lines represent the outlet valves. The upper diagram shows the control response, i.e., the path progression, of the controlled intake and exhaust valves in a fired operation of an EVD engine (engine with electromagnetic valve drive). The lower diagram shows the control response, i.e., the path progression, of the controlled intake and exhaust valves in an at least partially unfired operation of an EVD engine (braking mode), whereby the engine braking effect may be set by modifying the control of the intake and exhaust valves.

According to the invention, in addition to the delayed opening of the exhaust valves in braking or overrun mode the intake valves of the cylinder used for the braking effect are controlled in such a way that either the cylinder combustion chamber is filled with an increased air mass (prolonging of the valve opening time) and/or the opening of the intake valves is delayed, thereby generating an additional braking torque. The double arrows in the front and rear edges of the curves indicate only that the opening or closing of the intake and exhaust valves may be shifted in time as well as forward or backward by the control according to the invention.

In the example illustrated, the front edge for initiating the opening process for each intake valve of a cylinder operated in four-cycle mode may be maintained, so that, starting from top dead center of the piston, filling of the combustion chamber with air is initiated. The rear edge of the curve, which represents the initiation of the closing process of the intake valve, has been delayed, as the result of which the filling with air may take place over an extended time period. Thus, a larger volume of air is available for compression. As a result of the increased air volume that is compressed, in conjunction with the latest possible opening of the exhaust valves it is possible to generate a significantly increased braking torque in overrun mode.

FIGS. 3a, 3b; 4a, 4b show the results of the method according to the invention for corresponding control of the intake and exhaust valves in engine braking mode. FIGS. 3a and 4a show the valve lift, i.e., the control of the intake and exhaust valves, as well as the resulting exhaust gas dynamics, i.e., the pressure pulse generated thereby. FIGS. 3b and 4b both illustrate in a p-V diagram the pressure curve resulting from the compression of the air masses in the unfired cylinders. The association of individual time periods indicated by the arrows shows that at time T2 the desired pressure pulse is generated in the exhaust line 10 just after the exhaust valves are opened at time T1 and just before the exhaust valves reach maximum opening lift at time T3. As a matter of course, when the method according to the invention is used in combination with a four-cycle process a corresponding pressure pulse and a corresponding braking effect are generated only at the time of each fourth cycle (i.e., every 720° rotation of the crankshaft), whereas in combination with a two-cycle process, a corresponding pressure pulse is generated in the time period of every other cycle, thereby doubling the braking effect, i.e., the engine braking torque produced (thus, every 360° rotation of the crankshaft), and increasing the drive force for the supercharger device 8. In FIG. 3b according to the p-V diagram, during the first two cycles a curve (curve sections K1.1, K1.2) is generated which includes a very small area, since the pressure curve for unopened exhaust valves returns to its starting point with essentially the same curve progression. A curve progression (curve sections K1.3, K1.4) differing from the starting point, and thus a curve including larger partial areas, is obtained only during the last two cycles as the result of opening the exhaust valves. In comparison, it is clearly seen that when a two-cycle process is used, two practically identical curves are obtained over a total of four cycles (FIG. 4b). Since the partial areas included by the curve sections are equivalent to the intentionally generated charge exchange losses (charge exchange work), it is clearly seen that, compared to use of a four-cycle process, when a two-cycle process is used essentially twice the braking effect can be achieved by the method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating in an engine braking mode an internal combustion engine of a motor vehicle, the engine having variably controllable valve drives for intake and exhaust valves of each cylinder of the engine and at least one turbocharger device for increasing pressure in the intake tract of each cylinder, comprising the steps of:
    operating the internal combustion engine with at least one unfired cylinder; and
    controlling at least one of the intake valves and the exhaust valves to achieve compression of an air mass in each unfired cylinder corresponding to a predetermined braking torque.

2. The method according to claim 1, wherein
the at least one turbocharger device is impinged on by a pressure pulse generated by release of the compressed air mass under targeted control of the exhaust valves.

3. The method according to claim 1, wherein
the intake valves of each unfired cylinder are controlled to maximize amount of air drawn into the cylinder combustion chamber.

4. The method according to claim 1, wherein
the internal combustion engine alternates between two-cycle operation and four-cycle operation as needed to obtain the predetermined braking torque.

5. The method according to claim 1, wherein
the predetermined braking torque is set by controlling the exhaust valves.

6. The method according to claim 5, wherein
the predetermined braking torque is set by controlling the exhaust valves.

7. The method according to claim 1, wherein
overpressure in an intake duct of an intake tract of the internal combustion engine is limited by controlled opening of a bypass valve.

* * * * *